United States Patent
Goldthwaite et al.

(10) Patent No.: US 7,747,560 B2
(45) Date of Patent: Jun. 29, 2010

(54) METHODS AND SYSTEMS FOR PROVIDING A DISTRIBUTED DATABASE STORE WITH CORRELATION SERVICE

(75) Inventors: Flora P. Goldthwaite, Seattle, WA (US); Holly Serdy, Bellevue, WA (US); Jonathan C. Cluts, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2165 days.

(21) Appl. No.: 10/075,519

(22) Filed: Feb. 13, 2002

(65) Prior Publication Data

US 2003/0154480 A1 Aug. 14, 2003

(51) Int. Cl.
G06F 17/00 (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

| 6,052,440 A * | 4/2000 | Yuhn ........................ 379/88.13 |
| 6,369,840 B1 * | 4/2002 | Barnett et al. ............... 715/853 |
| 7,154,538 B1 * | 12/2006 | Fukasawa et al. ........ 348/211.3 |

OTHER PUBLICATIONS

Adams, N. M. et al., "Mining for classes and patterns in behavioural data," *J. Operational Res. Soc.*, 2001, 52(9), 1017/1024.
Ben Schafer, J. et al., "E-commerce recommendation applications," *Data Mining and Knowledge Discovery*, 2001, 5(1-2), 115-153.
Changchien, S.W. et al., "Mining association rules procedure to support on-line recommendation by customers and products fragmentation," *Expert Systems with Applications*, 2001, 20,(4), 325-335.
Chen, M. et al., "An integrated interactive environment fo rknowledge discovery from heterogeneous data resources," *Information Software Tech.*, 2001, 43(8), 487-496.
Liu, H. et al., "Toward multidatabase mining: Identifying relevant databases," *IEEE Trans. On Knowledge and Data Engineering*, 2001, 13(4), 541-553.
Spiliopoulou, M. et al., "Data mining for measuring and improving the success of web sites," *Data Mining and Knowledge Discovery*, 2001, 5(1-2), 85-114.

* cited by examiner

*Primary Examiner*—Isaac M Woo
(74) *Attorney, Agent, or Firm*—Woodcock Washburn LLP

(57) ABSTRACT

A digital history service presents a user's collected data in an historical format such as a timeline that includes various interactions with objects and people over the course of time wherein the digital history data was retrieved and correlated from the various data stores. An example of such a retrieval is to select a sequence of items from the data store based on an algorithm that determines the next item based on its relationship to the current item. The relationship could be a complex combination of the date, time of year, historical events in the past, the person(s) or objects involved in a given event, the location of an event, past or upcoming national holidays, calendar items, etc.

31 Claims, 9 Drawing Sheets

METHODS AND SYSTEMS FOR PROVIDING A DISTRIBUTED DATABASE STORE WITH CORRELATION SERVICE

FIELD OF THE INVENTION

The present invention relates generally to the field of computing. More particularly, the invention relates to a system and method for providing a correlation service.

BACKGROUND OF THE INVENTION

Many digital devices such as PDAs, Cell phones, MP3 players, Digital Cameras, and so on are available and gaining traction as essential digital devices. Other digital devices, such as personal computers, have already gained critical mass and are converging into key digital devices for homes and businesses. The result of the use of all of these various digital devices is that users are generating unprecedented amounts of digital data from various digital devices and computing applications. For example, digital picture data is captured by digital cameras and may be stored on a personal computer for access by a digital picture editing application; a calendar application provides a user with the ability to electronically control appointments and schedules. Many other applications that users interact with store data that is used by the application to track a user's activities such as INTERNET EXPLORER, which tracks a users history of visited web sites. There are many more such application examples that electronically track user activity and generate digital data.

Although users may access data and share data indirectly among various applications, the organization and harnessing of the data among the various applications would allow users to maximize the benefit from digitally recording activities. In particular, data that has an associated time reference could be cross-referenced to provide valuable information correlating a user's history or activity in time. No current technology provides storage and indexing for items making up a digitally recorded history consisting of various types of media and data. No current technology that is capable of making complex associations between data, especially non-textual data such as audio and video.

SUMMARY OF THE INVENTION

The present invention provides a digital history service that has a first data store comprising multimedia files (including text, audio, video, and so on) and a second data store comprising schedule data. The digital service then has computer instruction for correlating selected multimedia files from the first data store with selected schedule data from the second data store wherein the instructions provide information indicative of the correlated file by way of a network connection.

Of course, the data could exist in any location that is deemed appropriate. A primary data store could be used to contain references to other data substores. The data substores could exist in standard computer form factors such as computer/computer server or in other forms such as a PDA, a camera, or small storage device/tag physically attached to an item.

The correlation between the data may be a function of a combination of date, time of year, historical events in the past, the person(s) or objects involved in a given event (including proximity, ownership, etc.), the weather, past or upcoming national holidays, calendar items, etc. The correlated data may comprise temporal records along with media files, such as image files, audio files, and so on. The correlation among selected data may be based on a probability function that the one data file has a relationship to the first data file.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
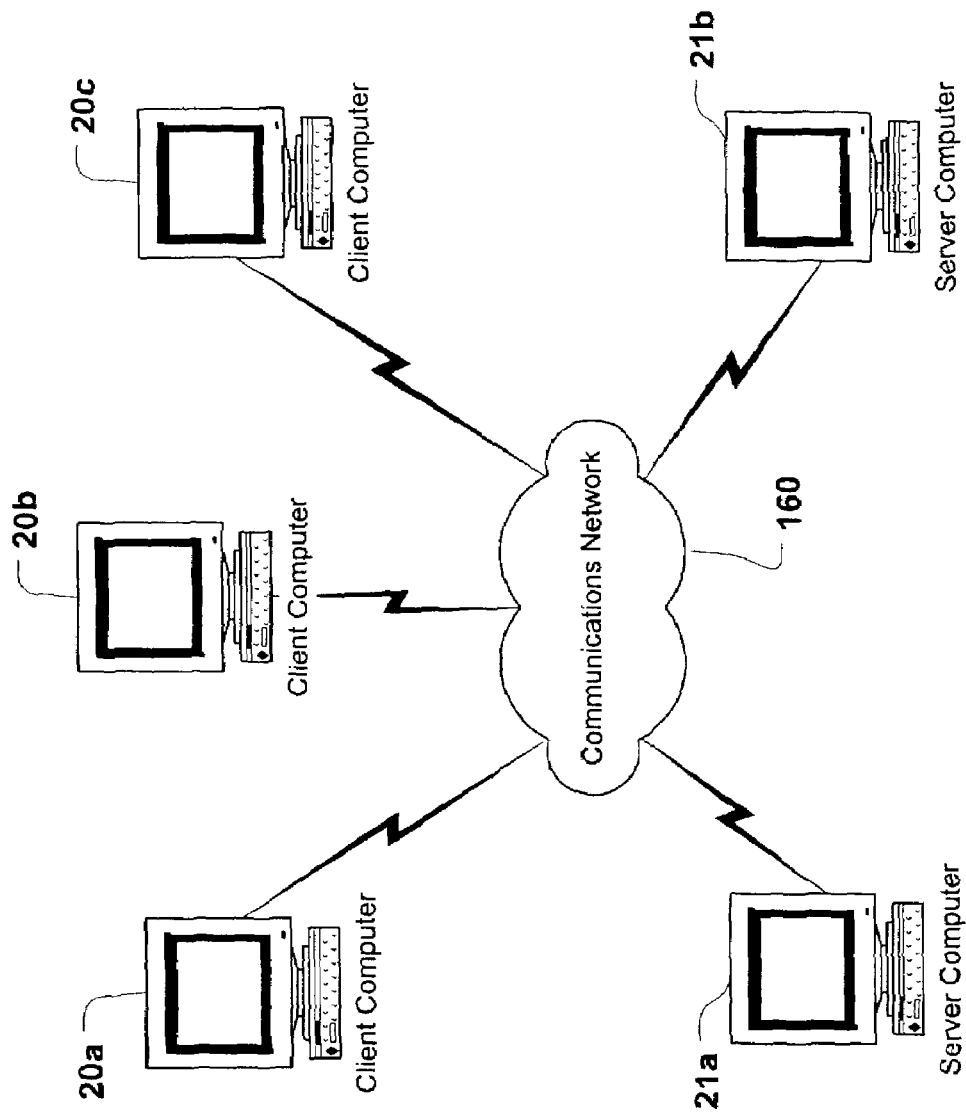
FIG. 1 is an example of a computer network wherein aspects of the present invention may be employed.

A digital history service presents a users collected data in an historical format such as a timeline that includes various interactions with objects and people over the course of time wherein the digital history data was retrieved and correlated from the various data stores. An example of such a retrieval is to select a sequence of items from the data store based on an algorithm that determines the next item based on its relationship to the current item. The relationship could be a complex combination of the date, time of year, historical events in the past, the person(s) or objects involved in a given event (including their proximity, ownership, etc.), the location of an event, past or upcoming national holidays, calendar items, etc.

Network Services Framework

Network Services (e.g., .NET Framework) provide a computing framework that is developing in light of the convergence of personal computing and the Internet. Individuals and business users alike are provided with a seamlessly interoperable and network-enabled interface for applications and computing devices, making computing activities increasingly browser or network-oriented. In general, a Network Services platform includes servers, building-block services, such as Web-based data storage and downloadable device software. The exact location of a particular service, control over events, a source of data, etceteras, is in some sense irrelevant to a particular computing device. Rather, the communications network gives particular computing devices the ability to leverage the resources of all of the other computing devices in the network.

Generally speaking, the such service provide (1) the ability to make the entire range of computing devices work together and to have user information automatically updated and synchronized on all of them, (2) increased interactive and interoperative capability for network computers, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a server and/or client computer, portions of the invention may also be implemented via an operating system or a "middle man" object between a network and device or object, such that services may be described in, supported in or accessed via any number of languages and services.

Software developers have progressed toward this goal by adopting proprietary componentized software methodologies, such as DCOM; however, because each vendor provides its own interface protocol, integration of different vendors' components is a nightmare. By substituting the Internet for proprietary transport formats and adopting standard protocols such as SOAP, Web Services help software developers create building blocks of software, which can be reused and integrated regardless of their location.

Network Services provide distributed software components that are accessible through standard web protocols. Network Services enable software to interoperate with a much broader range of clients.

Computing Environment

FIG. 1 illustrates how the Network Services may be implemented in a physical environment. Here computers 20a-20c and 21a-21b may host various Network Services applications and data. Although the physical environment shows the connected devices as computers, such illustration is merely exemplary and may comprise various digital devices such as PDAs, televisions, MP3 players, Cameras, etc. Moreover, communications network 160 may itself comprise a number of computers and network devices such as routers and the like, which also may be capable of hosting objects 10 and/or providing services to objects 10.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

In home networking environments, there are at least four disparate network transport media that may each support a unique protocol such as Power line, data (both wireless and wired), voice (telephone) and entertainment media. Most home control devices such as light switches and appliances will use power line for connectivity. Data Services enters home as broadband (either DSL or Cable modem) and is accessible within home using either wireless (HomeRF or 802.11b) or wired (Home PNA, Cat 5, even power line) connectivity. Voice traffic will enter the home either as wired (Cat 3) or wireless (cell phones) and distributed within the home using Cat 3 wiring. Entertainment Media enters home either through satellite or cable and is typically distributed in the home using coaxial cable. IEEE 1394 and DVI are also emerging as digital interconnects for clusters of media devices. All of these network environments may be interconnected to form an intranet that may be connected to the outside world by way of the Internet.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

Figure 2:
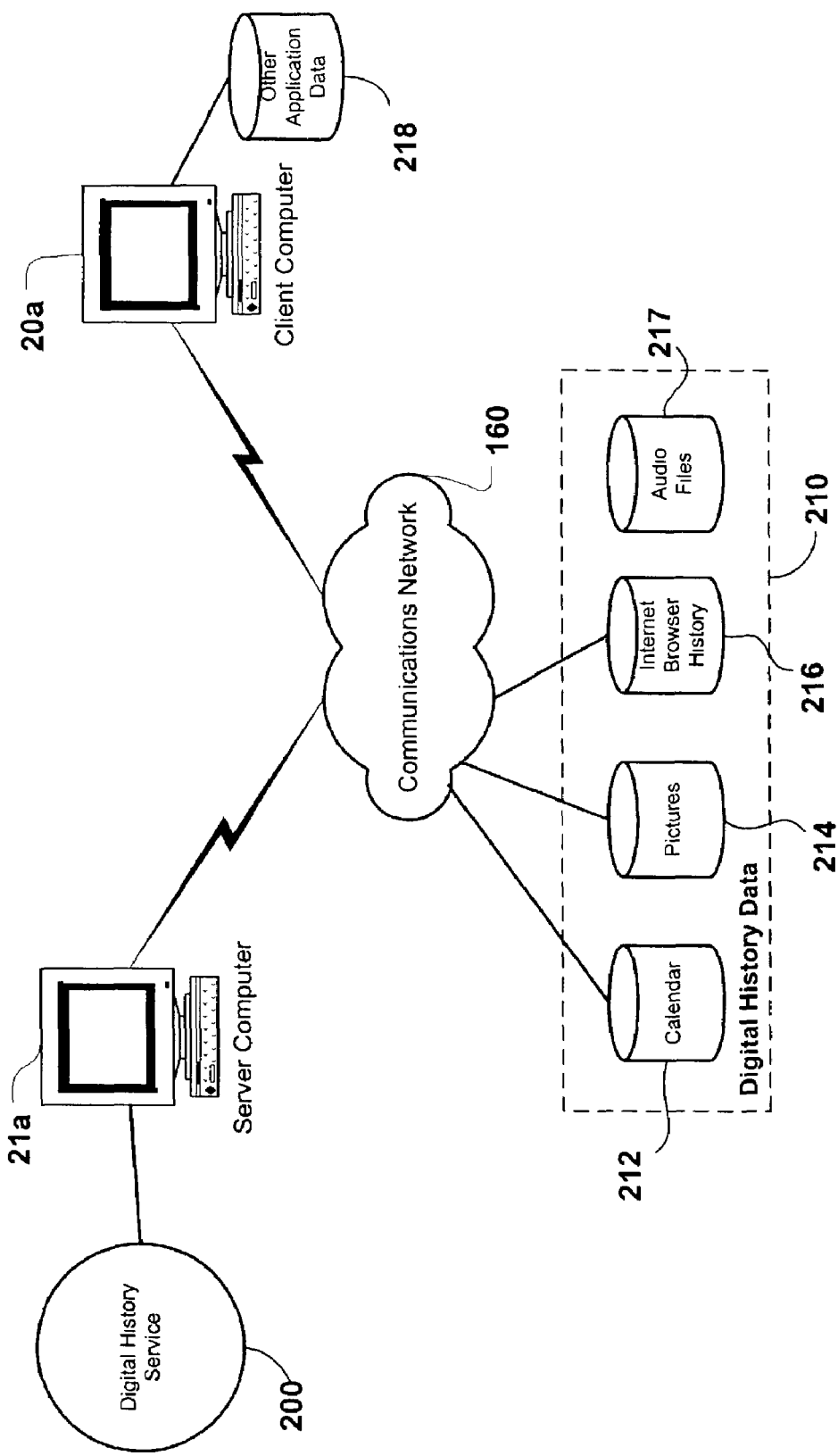
FIG. 2 illustrates the digital history service of the present invention in the context of the computer network of FIG. 1.

In general, the computer network may comprise both server devices and client devices deployed in a network environment (in a peer-to-peer environment devices may be both clients and servers). As illustrated FIG. 1, server computers communicate with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

FIG. 2 illustrates the operation of the invention in a network environment. A server computer 21a hosts a Digital History Service 200. Also coupled to the network is Digital History Data 210. Digital History Data 210 comprises various digital history data for a particular user, e.g., Calendar data 212, Picture data 214, Internet Browser History 216, Audio data 217 as well as various other types of multimedia data not shown including an combination of audio, video, text, and so on. The digital history data is shown here as connected to the communications cloud 160. This notation illustrates that the location of the data can be essentially anywhere so long as it is accessible by Digital History Service 200 and may be stored by server 20a as part of Digital History Service 200. Data may also be stored with client computer 20a, as indicated by data storage of Other Application Data 218. Accordingly, client 20a may request or query digital history service 200 for services with respect to a user's history data, e.g., Calendar 212, Picture 214, Internet Browser 216, Audi 217. As described in further detail below, the Digital History service correlates the data in the query to produce an output to client computer 20a regarding the digital history data.

The digital history data may be gathered from various application programs according to well known data formats. For example, the following list provides an example of various applications export files of a well-known type that could be processed by the Digital History service and cross correlated to produce a history result:

| Application | Extension |
| --- | --- |
| Microsoft Schedule+ 1.0 | .cal |
| Microsoft Schedule+ 7 x | .scd |
| Microsoft Schedule Plus Interchange | .sc2 |
| Microsoft Exchange Personal Address Book | .pab |
| Microsoft Internet Mail (IE 3.02) | .pst |
| ACT! 2.0, 3.0, or 4.0 for Windows | .dbf |
| ECCO 3.0, 3.01, 3.02, or 4.00 | .eco |
| SideKick 1.0/95 and 2.0 | .skcard |
| Lotus Organizer 1.0, 1.1, 2.1, and 97 | .org, .or2, .or3 |
| Comma Separated Values (MS-DOS) | .csv |
| Comma Separated Values (Windows) | .csv |
| Tab Separated Values (MS-DOS) | .txt |
| Tab Separated Values (Windows) | .txt |
| vCalendar | .vcs |
| VCard | .vcf |
| Microsoft Access | .mdb |
| Microsoft Excel | .xls |
| Microsoft FoxPro | .dbf |

In addition, pictures are maintained in a variety of well-known digital formats such as JPEG and GIF and so on. Audio files are stored as MPEG, WMA files, etc. Additionally, by associating various digital devices with a GPS device, location and time information can be associated with the creation of data. For example, a digital camera or digital recording device associated with a GPS system would permit data generated, e.g., pictures and audio files to be associated with a latitude/longitude or other indicator of location. Moreover, given an address, the Internet is replete with sites that provide a location of the address on a map. Accordingly, appointments at a given location can also be mapped to a particular latitude and longitude.

The present invention may also use geocodes to determine correlation between data sets. Geocodes can be used to specify a geographic location anywhere within the globe. A geocode represents a particular geographic area or grid defined by longitude and latitude coordinates. Longitude and latitude coordinates are used to define a geographic location relative to the surface of the earth. The earth's reference system is composed of surface divisions denoted by geographic lines of latitude and longitude. A specific geographic location can be defined in this system by its respective longitude and latitude coordinates.

Figure 3:
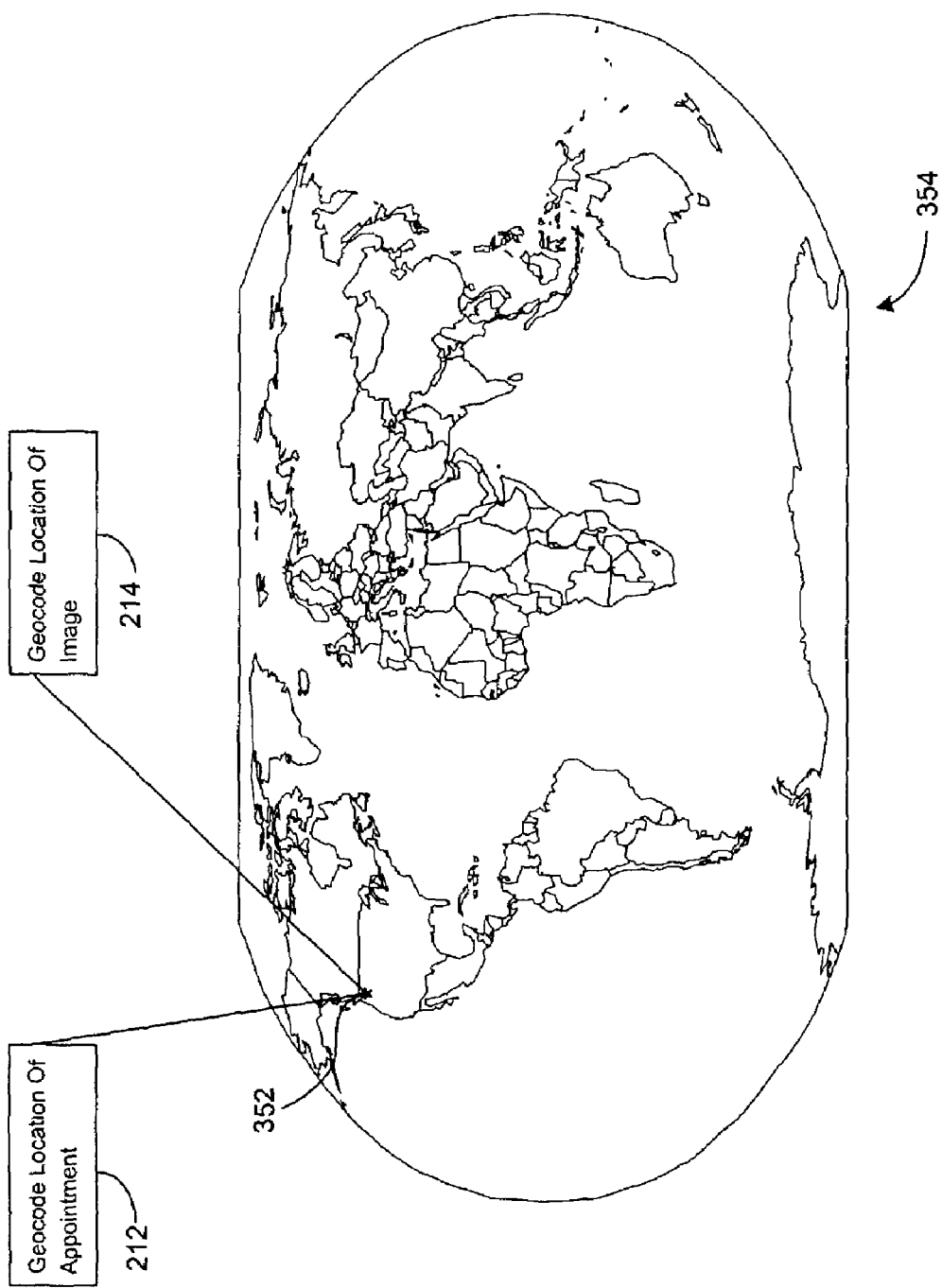
FIG. 3 illustrates a correlation between two records based on proximate geocodes.

FIG. 3 illustrates data associated with correlated locations on the earth (354) based geocode data. The area 352 is represented by a geocode associated with a latitude and a longitude coordinate. Typically, a latitude coordinate is specified in latitude degrees and a longitude coordinate is specified in latitude degrees. The invention contemplates the use of geocodes to identify locations of data in order to determine whether data has a relationship to a specified geographic area. Here, for example, an appointment 212 has a geocode proximate geocode 352 that can be correlated to an image 214 having a geocode proximate geocode 352.

Figure 4:
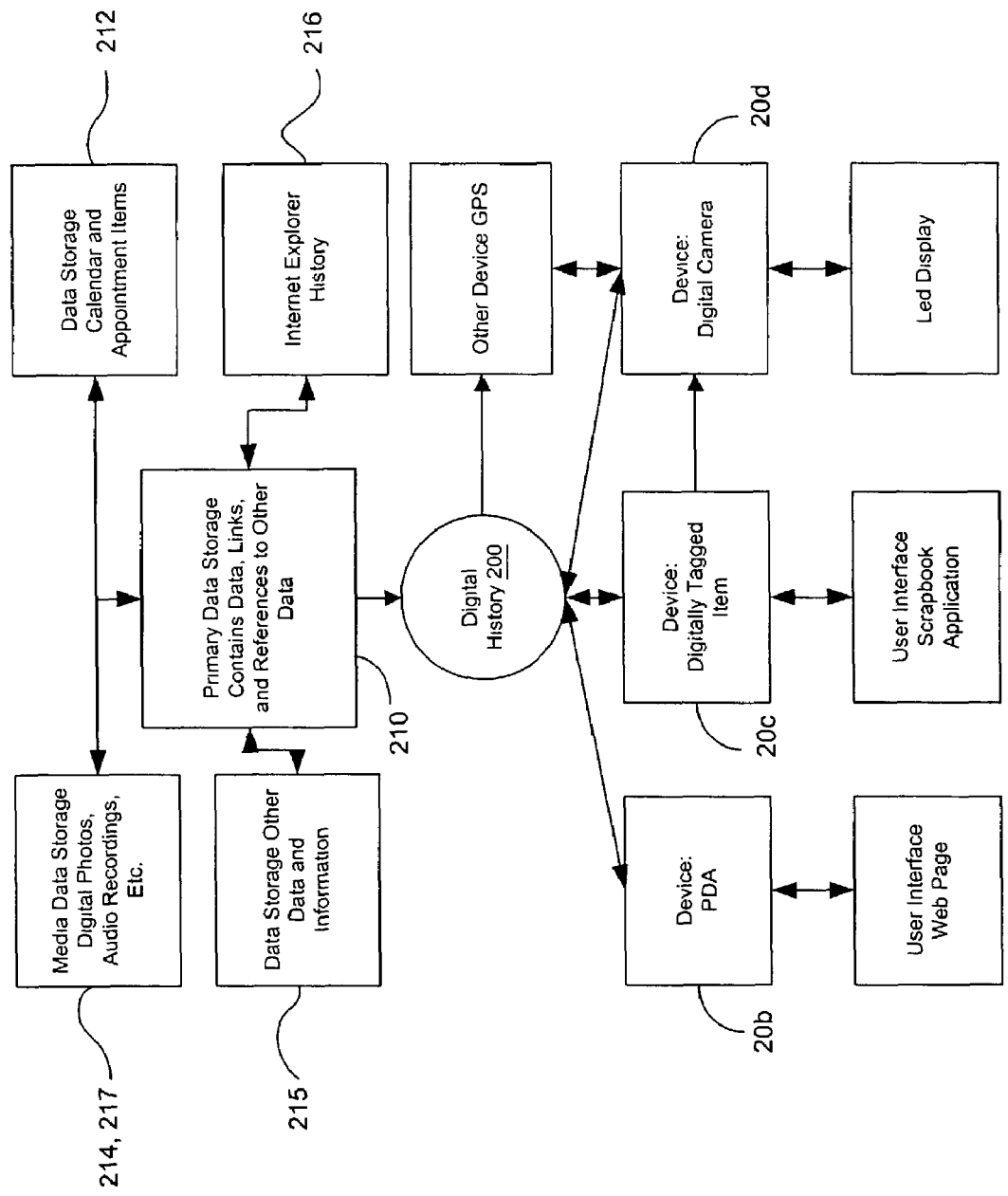
FIG. 4 illustrates an architecture of the digital history service wherein data originates from various digital devices.

FIG. 4 provides a generalized block diagram of the system of the present invention. Data, e.g., media 214, 217, calendar and appointment, 212, etc, could exist in any location that is deemed appropriate. A primary data store 210 may be used that contains references to other data substores, e.g., 214, 217, etc. The data substores could exist in standard computer form factors such as computer/computer server or in other forms such as a PDA 20b, a camera 20c, or small storage device/tag physically attached to an item 20c. A tag could be a commonly available RFID tag that could be used to store information or some other small computerized device that records sounds and other data from a physical device. For example, a musical instrument may contain electronics capable of recording and storing music that a user is playing.

The data itself may be stored in the data store or it might just contain information on how to locate information. For example, digital pictures may be stored on high capacity media storage device, but the primary data store would contain the data needed to index and retrieve the picture. An application or service may query a device for information that is then stored in the primary data store. For example, a service may ask a device that contains positioning capability to state its position. A given device may store information remotely, via the data store interface. For example, a positioning device may periodically communicate with the data store to provide its current position.

A given device may also store data locally either permanently or temporarily. For example, a camera may contain a permanent record of the owner's name and address. On the other hand, it may store images locally, but upload them at a later time to the server in the home for integration into the primary data store. While a digital camera has a built in capacity for storage, many other items do not. For items that typically do not contain local storage, a tag could be placed on a given device that provides some local storage. For example, an electronic guitar could be tagged allowing it to record music from the guitar.

Figure 4A:
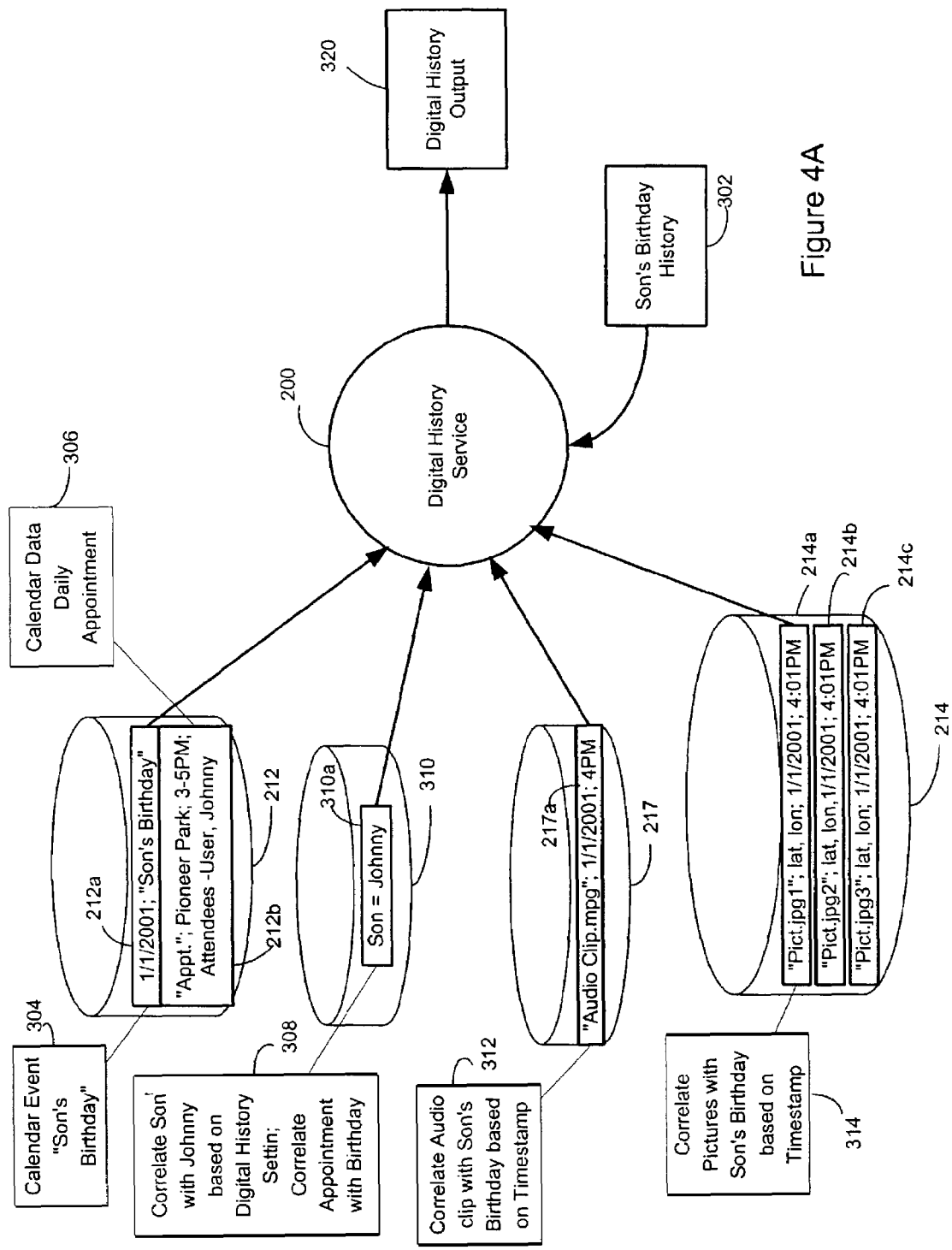
FIG. 4A provides an illustration of various data records being correlated in accordance with an aspect of the invention.

FIG. 4A further illustrates aspects of the invention wherein a query 302 has been submitted to the Digital History service. Here, the query is related to the user's son's birthday. This may have been a query submitted by the user or automatically triggered by the calendar event 212a appearing in the Calendar data 212. In either case, Calendar data 212 contains the event "Son's Birthday" indicating that Jan. 1, 2001 is the user's son's birthday. This event is recognized by the Digital History service 200 as recognized by step 304. Next, as indicated at step 306, the Digital History service 200 recognizes that the Calendar data 212 also contains an appointment record 212b on the same day as the birthday event. Record 212b indicates that the appointment is from 3-5PM at Pioneer Park and the attendees are listed as User and Johnny.

Next, by way of additional data such as a user setting in the Digital History service 200 (e.g., record 310a in data store 310), a contact list, or some other mechanism, Digital History service correlates at step 308 the appointment at Pioneer Park (record 212b) with the Birthday Event (record 212a). The Digital History service 200 then searches the remaining data stores, e.g. 217, 214, for related data. For example, at step 312 the audio clip 217a is correlated with the Birthday Event because the timestamp of the record 217a has a timestamp within the range of the appointment record 212b indicating that the recording likely was made at the appointment 212b. Similarly, at step 314 records 214a, 214b, 214c in Picture data 214 are correlated with the Birthday Event based on timestamp information and further based on the latitude/longitude information stored with the record placing the location where the digital photograph was taken.

Figure 5:
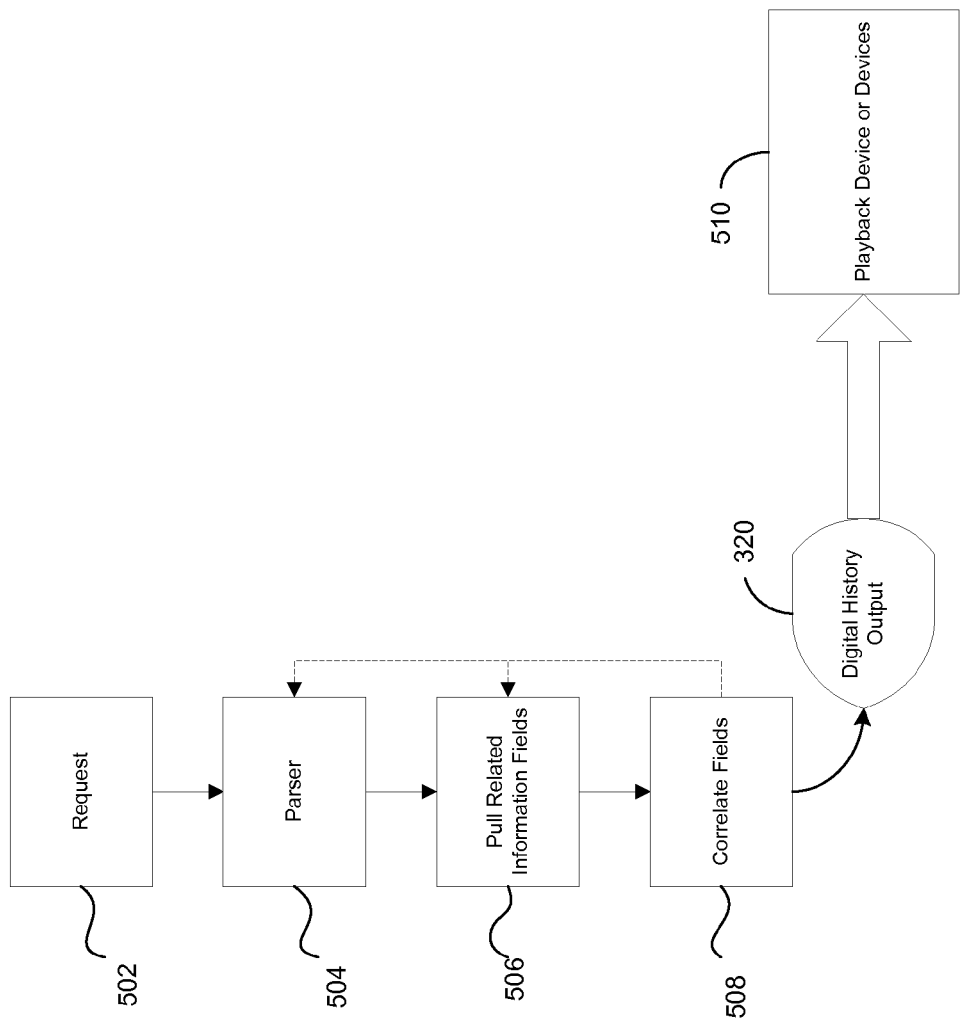
FIG. 5 is a flow chart of the correlation process in accordance with an aspect of the invention.

FIG. 5 is a flow chart of the operation of the digital history in accordance with the invention. Initially, a request 502 is made to the digital history service 200. Thereafter, parser 504 processes the request and determines which data stores may have relevant information to the digital history request. After the relevant data stores are identified, at step 506, the digital history service pulls out the information in fields of the data store to determine whether particular records are relevant to the request. The relevant field are then correlated, e.g., time in one record correlates to time in another record, location in one record correlates to location in another record, etc. A variety of known correlation techniques may be used to correlate the fields, e.g. probability techniques, clustering collaborative filter, or combinations of these techniques could be used to correlate various records. Additionally, as indicated by the dashed lines, depending on the outcomes of the various stages of the process, previous steps may be repeated. For example, a poor correlation result may cause different fields to be used in the pull related information fields step 506 or may cause the parser to locate different data stores for the correlation in step 504. Ultimately, a set of correlated records are produced an output in step 320. The digital history information is then available for playback on one or more devices as indicated in step 510.

There are a variety of applications that could leverage such a database: An application which acts like an index/search of a user's history. This application has a variety of user interfaces for accessing my history store, including customization of returned results that are based on specific and weighted criteria.

Example applications include:

An application that cross references public history with personal history.

A family trivia game wherein uses a family's digital history as content for the game.

The ability to know when a user last interacted with a digital device (including items that have unique digital id's).

The ability to associate various types of media/data with a specific object.

An artistic object that displays media items chosen from a user's history such that they relate to one another by some algorithmic approach. For example, based on today's date which is the user's birthday, the application could show pictures of the user's when the user was a kid, a video of a previous party, music from the user's guitar which was a birthday gift from his grandmother.

The ability to recall a step in a procedure, when something happened like a spill, or who went last in a game.

Aid to healthcare problems. A child has trouble sleeping on certain nights, a cross referencing of information happens to find correlations between the sleepless nights, looking at diet, environment and other influences and finds that the root beer she had on those nights has caffeine, or maybe the pollen count was high.

A family scrapbook application that allow serendipitous browsing of historical information and media.

Figure 6A:
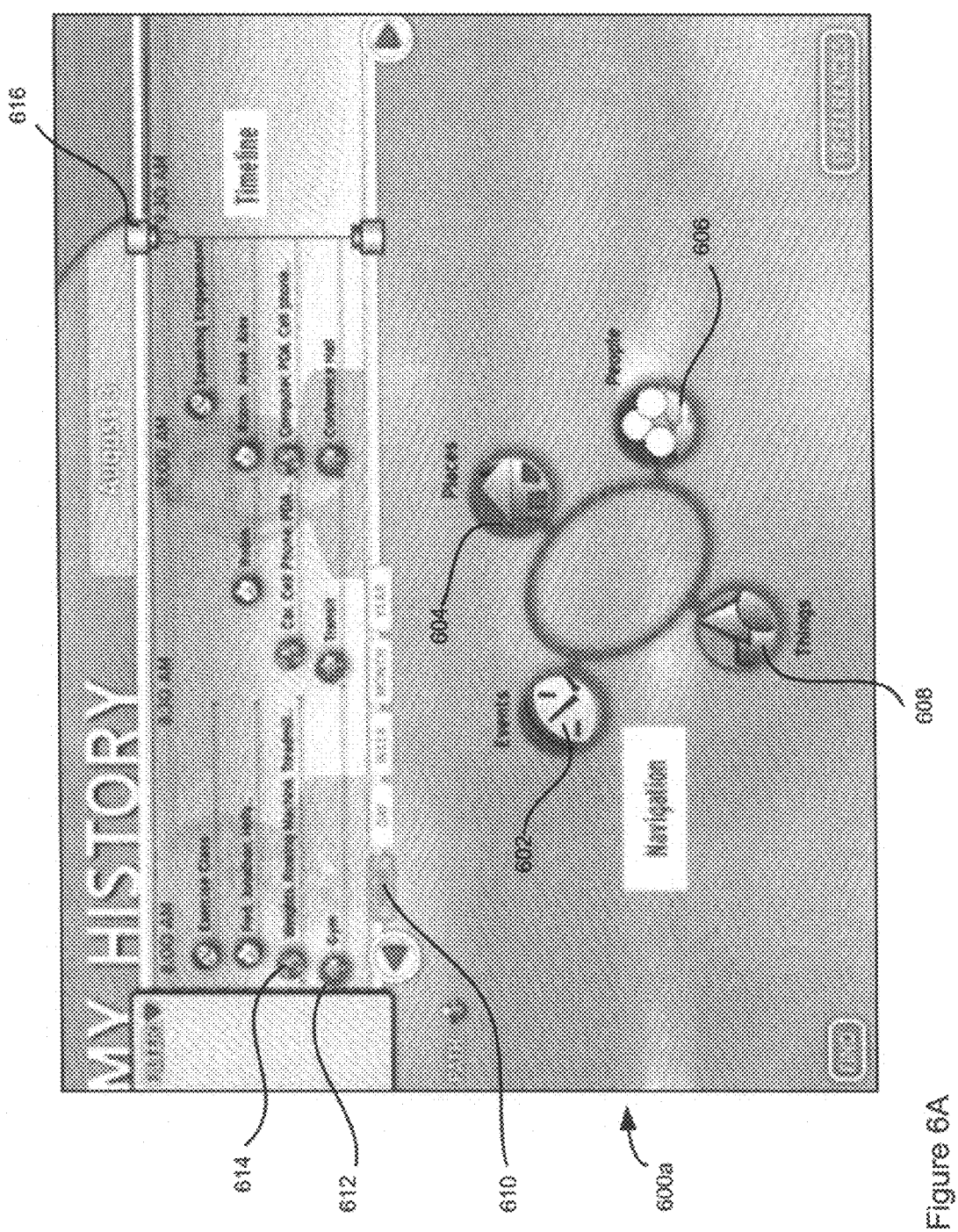
FIGS. 6A-6B provide an example of an interface to selected data from the digital history service in accordance with an aspect of the present invention; and, FIG. 7 is a schematic diagram of an exemplary computing system for carrying out the various computing functions described I accordance with the invention.

FIG. 6A illustrates one example of a front end to the digital history service. In this example, screen 600a provides navigation icons 602, 604, 606, 608 that provide a mechanism for a user to navigate through the digital history on the basis of Events 602, Places 604, People 606, and Things 608. A timeline at the top of screen 600a provides the ability to navigate in time. Buttons are provided whereby a user may select the appropriate granularity of time. For example, here the user has selected button 610 to organize the timeline by the hour. Icons representing various data records are displayed across the timeline in time order and in the following categories: Events 602, Places 604, People 606, and Things 608. For example, Gym icon 612, from the place category, indicates the user had an appointment at the Gym. Icon 614, from the things category, indicates various pieces of exercise equipment (e.g., captured by electronic exercise machines). The scroll bar 616 provides a mechanism for moving through the digital history data in time.

Figure 6B:
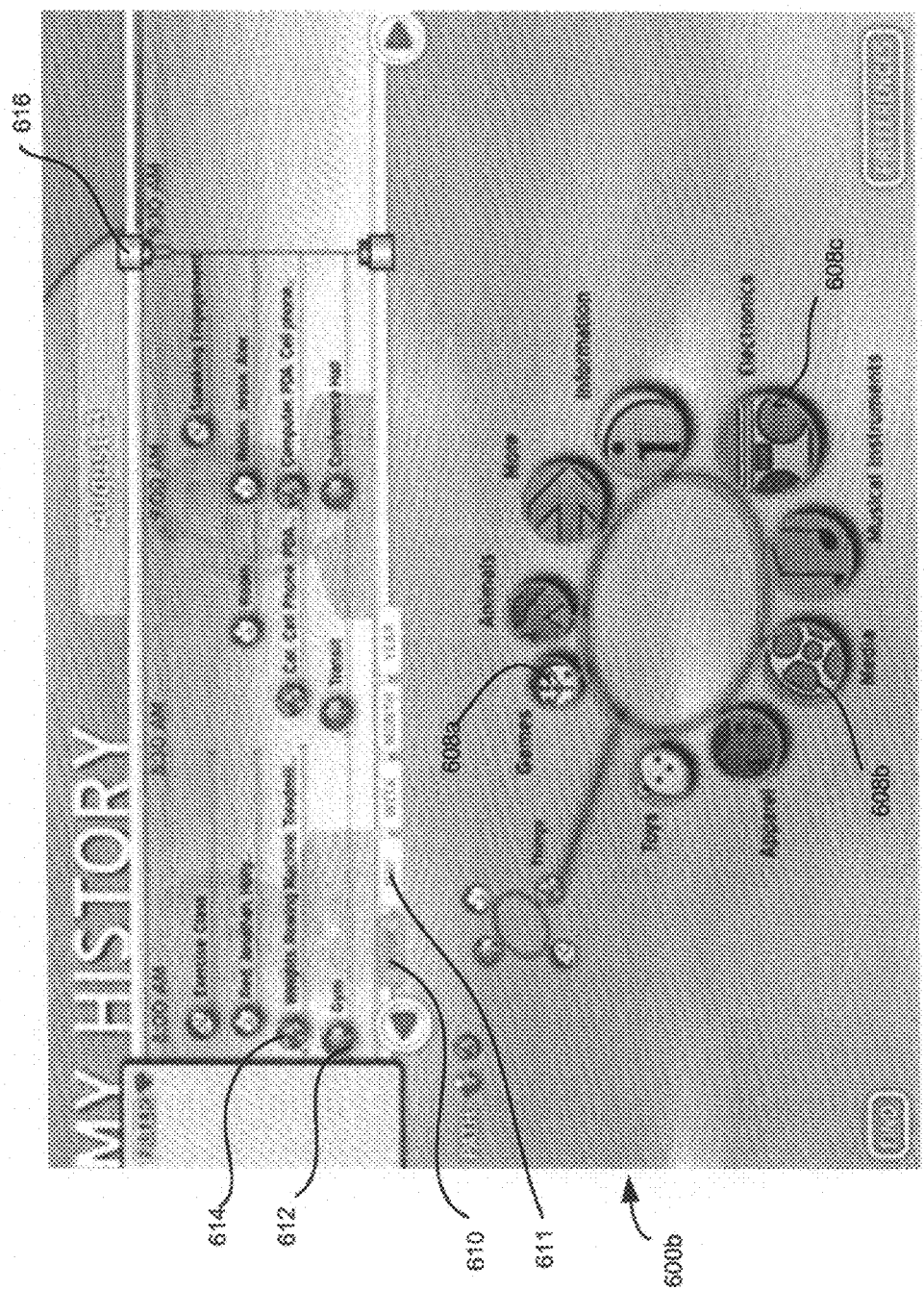

FIG. 6B illustrates another aspect of the example digital history interface. In this screen 603b, a user has selected the things icon 608 from screen 600a. Thereafter, further groupings of the users data is provided, e.g., games 608a, media 608b, and electronics 608c. Items that exhibit predefined usage patterns, e.g., most recently, most frequently, are shown with a larger icon to provide the user with a visual cue regarding usage patterns of the data.

Figure 7:
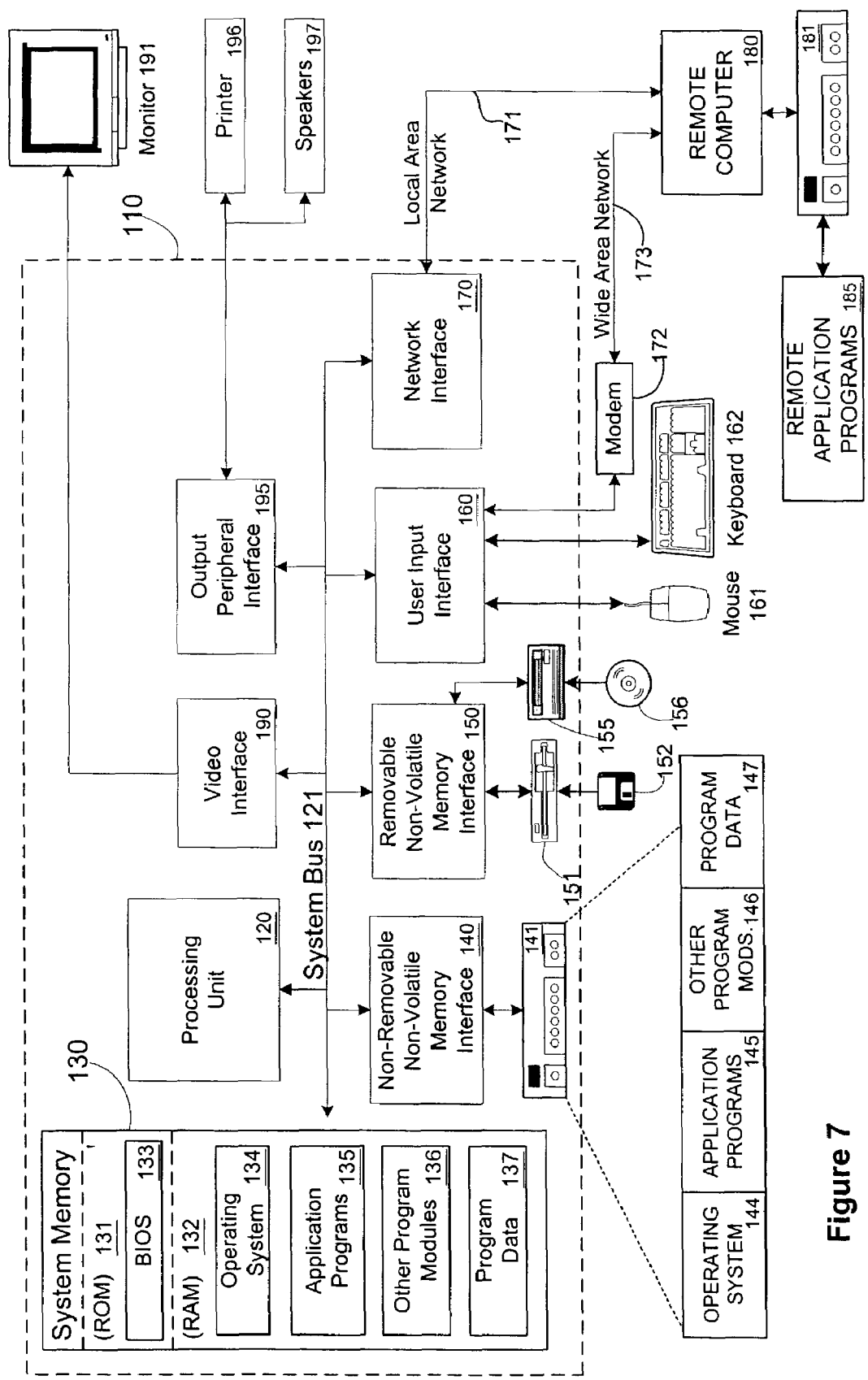

With reference to FIG. 7, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A digital history system comprising:
   a first data store comprising multimedia files having historical information wherein the multimedia files are generated by at least one multimedia application program;
   a second data store comprising schedule data wherein the schedule data is generated by an application program that is a different application program than the at least one multimedia application program; and,
   at least one memory comprising:
   a set of computer readable instructions that, when executed by a processor, correlate selected multimedia files from the first data store with selected schedule data from the second data store by associating the historical information of the multimedia files with the schedule data; and
   a set of computer readable instructions that, when executed by a processor, provide, by way of a network connection, information indicative of the correlated multimedia file relative to the schedule data.

2. The digital history system as recited in claim 1 wherein the multimedia files comprise at least one of an audio file and a video file.

3. The digital history system as recited in claim 1 wherein the multimedia files comprise a text file.

4. The digital history system as recited in claim 1 wherein the historical information comprises time information associated with the multimedia files.

5. The digital history system as recited in claim 4 wherein the correlation is based upon a second correlation factor.

6. The digital history system as recited in claim 5 wherein the second correlation factor is location.

7. The digital history system as recited in claim 6 wherein the location is a function of latitude and longitude.

8. The digital history system as recited in claim 1 wherein the network connection comprises an Internet connection.

9. The digital history system as recited in claim 1 wherein the correlation is based upon a probability that the selected multimedia files are related to an event indicated by the selected schedule data.

10. The digital history system as recited in claim 1 wherein the correlation is based upon a clustering.

11. A method for providing information about a past event, comprising:
   providing a first data store comprising media files having an associated time of creation wherein the media files are generated by at least one application program;
   providing a second data store comprising records having an associated time function wherein the records having the associated time function are generated by an application program that is a different application program than the at least one application program that generated the media files;
   correlating selected media files with selected records as a function of the time of creation of the media files and the time function associated with the records; and
   providing information indicative of the selected media files and the selected records for temporal presentation to a user.

12. The method as recited in claim 11 wherein the media files comprise image data.

13. The method as recited in claim 11 wherein the media files comprise audio data.

14. The method as recited in claim 11 wherein the media files comprise text files.

15. The method as recited in claim 11 wherein the second data store comprises calendar data.

16. The method as recited in claim 11 wherein the act of correlating comprises determining a probability that the function of time indicates that the media files have an association with the selected records.

17. The method as recited in claim 16 wherein the act of correlating further comprises correlating the select media files with the selected records in time and space.

18. The method as recited in claim 17 wherein the correlation in space is a function of a geographic location data associated with the selected media files and geographic location data associated with the selected records.

19. The method as recited in claim 11 wherein the method is provided as a network service over a network connection.

20. A computer-readable medium bearing computer-readable instructions for carrying out the acts recited in claim 11.

21. A computer-readable medium having stored thereon computer readable-instructions for providing a network service, comprising:

accessing a first data store comprising media files having an associated time of creation wherein the media files are generated by at least one application program;

accessing a second data store comprising records having an associated time function wherein the records having the associated time function are generated by an application program that is a different application program than the at least one application program that generated the media files;

correlating selected media files with selected records as a function of the time of creation of the media files and the time function associated with the records;

providing information indicative of the selected media files and the selected records for presentation to a user as a function of an event having an associated time.

22. The computer-readable medium as recited in claim 21 wherein the act of accessing comprises reading data from one of the first data store and the second data store over a network.

23. The computer-readable medium as recited in claim 21 wherein the media files comprise image data.

24. The computer-readable medium as recited in claim 21 wherein the media files comprise audio data.

25. The computer-readable medium as recited in claim 21 wherein the media files comprise text data.

26. The computer-readable medium as recited in claim 21 wherein the second data store comprises calendar data.

27. The computer-readable medium as recited in claim 21 wherein the act of correlating comprises determining a probability that the function of time indicates that the media files have an association with the selected records.

28. The computer-readable medium as recited in claim 27 wherein the act of correlating further comprises correlating the select media files with the selected records in time and space.

29. The computer-readable medium as recited in claim 28 wherein the correlation in space is a function of a geographic location data associated with the selected media files and geographic location data associated with the selected records.

30. The computer-readable medium as recited in claim 21 wherein the method is provided as a network service over a network connection.

31. The computer-readable medium as recited in claim 21 wherein the first data store comprises data from a first application and the second data store comprises data from a second data store.

* * * * *